Patented Aug. 25, 1936

2,052,164

UNITED STATES PATENT OFFICE 2,052,164

PREVENTING FOAMING OF EMULSIONS

Hyym E. Buc, Roselle, N. J., assignor to Standard Oil Development Company, a corporation of Delaware No Drawing. Application December 27, 1933, Serial No. 704,143

3 Claims. (Cl. 252—6)

This invention relates to the prevention of foaming of emulsions. Broadly, it comprises the incorporation, into the oily phase of the emulsion, of a small amount of a material of the type of saturated high molecular weight fatty acids.

The invention has been found particularly applicable to oil-in-water emulsions in which oil-soluble sulfonates derived by treating heavy petroleum oils with strong sulfuric acid are used as emulsifying agents. These sulfonates are sometimes called mahogany sulfonates and may be obtained and purified by any of the well known methods. One particular method of purification is described in applicant's co-pending application, Serial No. 626,233. These oil-soluble sulfonates may be used either alone or in conjunction with addition agents such as ammonium or triethanolamine oleates or linoleates, naphthenates, water-soluble sulfonates and other compounds which may be added to alter the emulsifying properties of the oil-soluble sulfonates.

The oil to be used in preparing the emulsions may be any one of a number of different types, for example, a mineral oil ranging in viscosity anywhere from that of kerosene up to the very viscous lubricating oils, mineral white oils such as those marketed under the trade names of Nujol, Marcol, etc. besides animal and vegetable oils such as castor oil, cottonseed oil and whale oil or mixtures thereof.

The preferred froth-preventing agent is stearic acid, although other high molecular weight saturated fatty acids may be used, such as palmitic, margaric, arachidic, etc., or the saturated fatty acids obtained upon the oxidation of high molecular weight petroleum hydrocarbons such as paraffin wax or heavy paraffinic oil. The amount of the non-frothing agent to be used is preferably very small, i. e. within the approximate limits of 0.2 to 2.0%, based on the amount of emulsifying agent used.

In preparing non-frothing emulsions according to the present invention, any satisfactory method of incorporating the materials may be used, but it has been found preferable to add the stearic acid or other froth-preventing agent either directly to the oil to be emulsified or to the emulsifying agent. In any case, it should be incorporated before the emulsion is formed because it is insoluble in water and therefore would have difficulty in penetrating through the aqueous phase of the emulsion in order to dissolve in the oil phase.

As a specific illustration of the invention, the following example is given:

Example

| | |
|---|---|
| Stearic acid | 1 part |
| Oil-soluble sulfonates | 99 parts |
| Heavy mineral white oil | 500 parts |

These materials are dissolved together and added to 5,000 parts of water, thereby forming a substantially non-foaming emulsion.

Non-frothing emulsions, prepared according to the invention, have been found particularly useful as cutting oils or emulsions to be used in the leather and textile industry.

It is not desired that the invention should be limited to any of the specific examples which were given merely for the sake of illustration nor to any theories of operation of the invention but in the appending claims it is desired to claim all inherent novelty in the invention as broadly as the prior art permits.

I claim:

1. A substantially non-frothing emulsion comprising a heavy mineral white oil, water, an oil-soluble sulfonate emulsifying agent and stearic acid in an amount ranging from 0.2 to 2.0% of the amount of oil-soluble sulfonate present.

2. An oil-in-water emulsion containing, in addition to oil, water and an emulsifying agent, a substance selected from the class consisting of high molecular weight saturated fatty acids in an amount ranging from 0.2 to 2% of the amount of emulsifying agent present.

3. A stable non-frothing cutting oil containing, in addition to a heavy mineral oil, water and an oil-soluble sulfonated emulsifying agent adapted to produce an oil-in-water emulsion, a saturated fatty acid selected from the group consisting of stearic, palmitic, arachidic and those acids produced by the oxidation of paraffin wax and heavy paraffinic oils in an amount ranging from 0.2 to 2% of the amount of emulsifying agent present.

HYYM E. BUC.